US011760304B2

(12) United States Patent
Hicke et al.

(10) Patent No.: US 11,760,304 B2
(45) Date of Patent: Sep. 19, 2023

(54) UTILITY VEHICLE

(71) Applicant: Polaris Industries Inc., Medina, MN (US)

(72) Inventors: David J. Hicke, Chisago City, MN (US); Jonathon P. Graus, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/525,175

(22) Filed: Nov. 12, 2021

(65) Prior Publication Data

US 2022/0153225 A1   May 19, 2022

Related U.S. Application Data

(60) Provisional application No. 63/114,804, filed on Nov. 17, 2020.

(51) Int. Cl.
  *B60R 22/26*   (2006.01)
  *B60R 22/46*   (2006.01)
  (Continued)

(52) U.S. Cl.
  CPC .......... *B60R 22/26* (2013.01); *B60R 22/4604* (2013.01); *B60R 2022/027* (2013.01);
  (Continued)

(58) Field of Classification Search
  CPC ..... B60R 22/26; B60R 22/46; B60R 22/4604; B60R 2022/4609; B60R 2022/4666;
  (Continued)

(56) References Cited

U.S. PATENT DOCUMENTS 5,076,608 A * 12/1991 Shimose ............... B60R 22/001
  280/801.1
6,142,524 A * 11/2000 Brown .............. B60R 21/01546
  297/480
(Continued)

FOREIGN PATENT DOCUMENTS

| EP | 1591327 A1 * | 11/2005 | ............. B60R 22/02 |
| GB | 2595014 A * | 11/2021 | ............... B60Q 1/52 |
| WO | WO-2008052608 A1 * | 5/2008 | ......... B60R 21/0134 |

OTHER PUBLICATIONS

Description Translation for EP 1,591,327 from Espacenet (Year: 2005).*

*Primary Examiner* — Jason D Shanske
*Assistant Examiner* — Daniel M. Keck
(74) *Attorney, Agent, or Firm* — Faegre Drinker Biddle & Reath LLP (57) ABSTRACT

A restraint system for a utility vehicle comprising a first restraint including a first retractor coupled to the utility vehicle at a first retractor anchor point, a first webbing retractable into the first retractor and having a first end and a second end, a first latch moveably engaged with the first webbing, and a first latch receiver configured to receive the first latch, and a second restraint including a second retractor coupled to the utility vehicle at a second retractor anchor point, a second webbing extendable from and retractable into the second retractor and having a first end coupled to the second retractor and a second end, a second latch coupled to the second webbing, and a second latch receiver positioned at a second receiver anchor point and configured to receive the second latch and retain the second end of the second webbing adjacent the second receiver anchor point.

29 Claims, 7 Drawing Sheets

(51) Int. Cl.
*B60R 22/02* (2006.01)
*B60R 22/18* (2006.01)

(52) U.S. Cl.
CPC .............. *B60R 2022/1818* (2013.01); *B60R 2022/4609* (2013.01); *B60Y 2200/124* (2013.01); *B60Y 2200/20* (2013.01)

(58) Field of Classification Search
CPC ...... B60R 2022/027; B60R 2022/1818; B60R 22/195; B60R 21/01; B60R 22/02; B60Y 2200/124; B60Y 2200/20
See application file for complete search history.

(56) References Cited

U.S. PATENT DOCUMENTS

| | | | | |
|---|---|---|---|---|
| 6,702,326 | B1* | 3/2004 | Fujii | B60R 22/46 |
| | | | | 280/806 |
| 8,864,174 | B2* | 10/2014 | Minami | B60N 2/36 |
| | | | | 280/756 |
| 9,669,796 | B2* | 6/2017 | Ohno | B60R 22/26 |
| 2004/0160051 | A1* | 8/2004 | Cheng | B60R 22/06 |
| | | | | 280/808 |
| 2005/0192727 | A1* | 9/2005 | Shostak | G07C 5/0808 |
| | | | | 701/1 |
| 2014/0138942 | A1* | 5/2014 | Rouhana | B60R 22/02 |
| | | | | 280/807 |
| 2016/0257283 | A1* | 9/2016 | Muto | B60R 22/26 |
| 2016/0375757 | A1* | 12/2016 | Danielson | B60K 17/342 |
| | | | | 180/68.1 |

* cited by examiner

UTILITY VEHICLE

CROSS-REFERENCE TO RELATED APPLICATION

The present application claims the benefit of U.S. Provisional Patent Application No. 63/114,804, filed Nov. 17, 2020, the disclosure of which is incorporated herein by reference.

FIELD OF THE DISCLOSURE

The present invention relates to a utility vehicle and, more particularly, to an all-terrain utility vehicle.

BACKGROUND

Generally, all-terrain vehicles ("ATVs") and utility vehicles ("UVs") are used to carry one or more passengers. There is increasing recreational interest in the market for ATVs, specialty ATVs, and UVs, such as those used for trail riding, racing, and/or cargo hauling. Some UVs and/or ATVs are configured for utility and cargo hauling needs and, alternatively, some UVs and/or ATVs are configured for sport and racing and, as such, are configured for faster speeds. Regardless of the configuration, safety of the passengers is an important factor. Various restraint systems and configurations of those restraint systems may be available for increasing the safety of the passengers including when the ATVs and UVs are used in applications such as racing at high speeds or navigating precarious terrain. Safety systems are an important component of all types of transportation and are not limited only to ATVs and UVs.

It is with respect to these and other general considerations that embodiments have been described. Also, although relatively specific problems have been discussed, it should be understood that the embodiments should not be limited to solving the specific problems identified in the background.

SUMMARY OF THE DISCLOSURE

In a first example, a restraint system for a utility vehicle comprises a first restraint including a first retractor coupled to the utility vehicle at a first retractor anchor point, a first webbing extendable from and retractable into the first retractor and having a first end coupled to the utility vehicle at a first end anchor point and a second end coupled to the first retractor, a first latch moveably engaged with the first webbing between the first and second end, and a first latch receiver configured to receive the first latch and retain a portion of the first webbing to the utility vehicle at a first receiver anchor point; and a second restraint including a second retractor coupled to the utility vehicle at a second retractor anchor point, a second webbing extendable from and retractable into the second retractor and having a first end coupled to the second retractor and a second end, a second latch coupled to the second webbing at the second end of the second webbing, and a second latch receiver positioned at a second receiver anchor point and configured to receive the second latch and retain the second end of the second webbing adjacent the second receiver anchor point.

In some embodiments, the first and second retractors of the restraint system are operable to be selectively locked to limit extension of the first and second webbing from the corresponding first and second retractors.

In some embodiments, the first and second retractors of the restraint system are operable to be selectively locked in response to an electronic signal.

In some embodiments, the restraint system further comprises a sensor array operable to provide the electronic signal to at least one of the first retractor and the second retractor based on at least one of utility vehicle conditions and user input.

In some embodiments, the sensor array of the restraint system is operable to sense at least one of brake pressure, vehicle speed, pedal position, engine speed, fault conditions, pitch angle, roll angle, gear position, steering angle, steering velocity, fuel level, and key switch position.

In some embodiments, the first and second retractors of the restraint system are operable to pretension the first and second webbings respectively in response to an electronic signal.

In some embodiments, the first and second retractors of the restraint system are operable to be selectively locked after pretensioning the first and second webbings, respectively.

In some embodiments, the restraint system further comprises a sensor array operable to provide the electronic signal to at least one of the first retractor and the second retractor based on at least one of utility vehicle conditions and user input.

In some embodiments, the sensor array of the restraint system is operable to sense at least one of brake pressure, vehicle speed, pedal position, engine speed, fault conditions, pitch angle, roll angle, gear position, steering angle, steering velocity, fuel level, and key switch position.

In some embodiments, f the restraint system further comprises a sensor array operable to provide the electronic signal to at least one of the first retractor and the second retractor based on at least one of utility vehicle conditions, wherein the first and second webbings are pretensioned as a driver warning.

In some embodiments, the sensor array of the restraint system is operable to sense at least one of brake temperature, belt temperature, engine temperature, low fuel, engine speed, vehicle speed, passenger restraint system engagement, and misfiring of engine.

In some embodiments, the first end anchor point at which the first restraint couples to the utility vehicle is substantially the same as the second receiver anchor point at which the second restraint couples to the utility vehicle.

In some embodiments, the restraint system further comprises a third restraint including a third retractor coupled to the utility vehicle at a third retractor anchor point, a third webbing extendable from and retractable into the third retractor and having a first end coupled to the third retractor and a second end, a third latch coupled to the third webbing at the second end, and a third latch receiver positioned at a third receiver anchor point and configured to receive the third latch and retain the second end of the third webbing adjacent the third receiver anchor point. operable to removably couple with the third latch and operable to couple with the utility vehicle at a seventh position, the third webbing.

In some embodiments, the first restraint of the restraint system is operable to extend across a user's shoulder, torso, and lap, wherein the second restraint is operable to extend across the user's torso and opposite shoulder, and wherein the third restraint is operable to extend across the user's legs.

In a second example, a restraint system for securing a user in a utility vehicle comprises a first restraint including a first webbing, the first restraint having an engaged configuration and a disengaged configuration, the first webbing being positioned across a first shoulder, a torso, and a lap of the user in the engaged configuration, and a second restraint including a second webbing, the second restraint having an engaged configuration and a disengaged configuration, the second webbing being positioned across a second shoulder and the torso of the user in the engaged configuration.

In some embodiments, the first restraint and the second restraint of the restraint system are operable to be independently maintained in the engaged configuration and the disengaged configuration, respectively.

In some embodiments, the restraint system further comprises a third restraint including a third webbing, the third restraint having an engaged configuration and a disengaged configuration, the third webbing being positioned across legs of the user in the engaged configuration.

In a third example, a utility vehicle comprises a plurality of ground-engaging members, a frame supported by the plurality of ground-engaging members, a powertrain assembly including an engine supported by the frame, an operator area supported by the frame and having at least an operator seat including a seat bottom and a seat back configured to support an operator, a first restraint including a first webbing, the first restraint having an engaged configuration and a disengaged configuration, the first webbing being positioned across a first shoulder and a torso of the operator in the engaged configuration, and a second restraint including a second webbing, the second restraint having an engaged configuration and a disengaged configuration, the second webbing being positioned across a second shoulder and the torso of the operator in the engaged configuration.

In some embodiments, the first restraint further includes a first retractor, the first webbing coupled to the first retractor, and wherein the second restraint further includes a second retractor, the second webbing coupled to the second retractor.

In some embodiments, the utility vehicle further comprises a sensor array operable to sense least one of utility vehicle conditions and user input and provide an electronic signal to the first and second retractors when a predetermined utility vehicle condition or user input is sensed, the first and second retractors operable to lock upon receipt of the electronic signal.

In some embodiments, the first and second retractors are operable to pretension the first and second webbings upon receipt of the electronic signal.

In a fourth example, a restraint system for a utility vehicle comprises a first restraint including a first retractor coupled to the utility vehicle at a first retractor anchor point, a first webbing extendable from and retractable into the first retractor, a first latch coupled to the first webbing, and a first latch receiver configured to receive the first latch and retain a portion of the first webbing to the utility vehicle at a first receiver anchor point, and a second restraint including a second retractor coupled to the utility vehicle at a second retractor anchor point, a second webbing extendable from and retractable into the second retractor and having a first end coupled to the second retractor and a second end, a second latch coupled to the second webbing at the second end of the second webbing, and a second latch receiver positioned at a second receiver anchor point and configured to receive the second latch and retain the second end of the second webbing adjacent the second receiver anchor point.

In some embodiments, the first and second retractors are operable to pretension the first and second webbings respectively in response to an electronic signal.

BRIEF DESCRIPTION OF THE DRAWINGS

The above-mentioned aspects and other features of this disclosure, and the manner of attaining them, will become more apparent and the embodiments disclosed herein will be better understood by reference to the following description of embodiments taken in conjunction with the accompanying drawings, where.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, road vehicles, aircraft, watercraft, commercial vehicles, and recreational vehicles such as golf carts.

Figure 1:
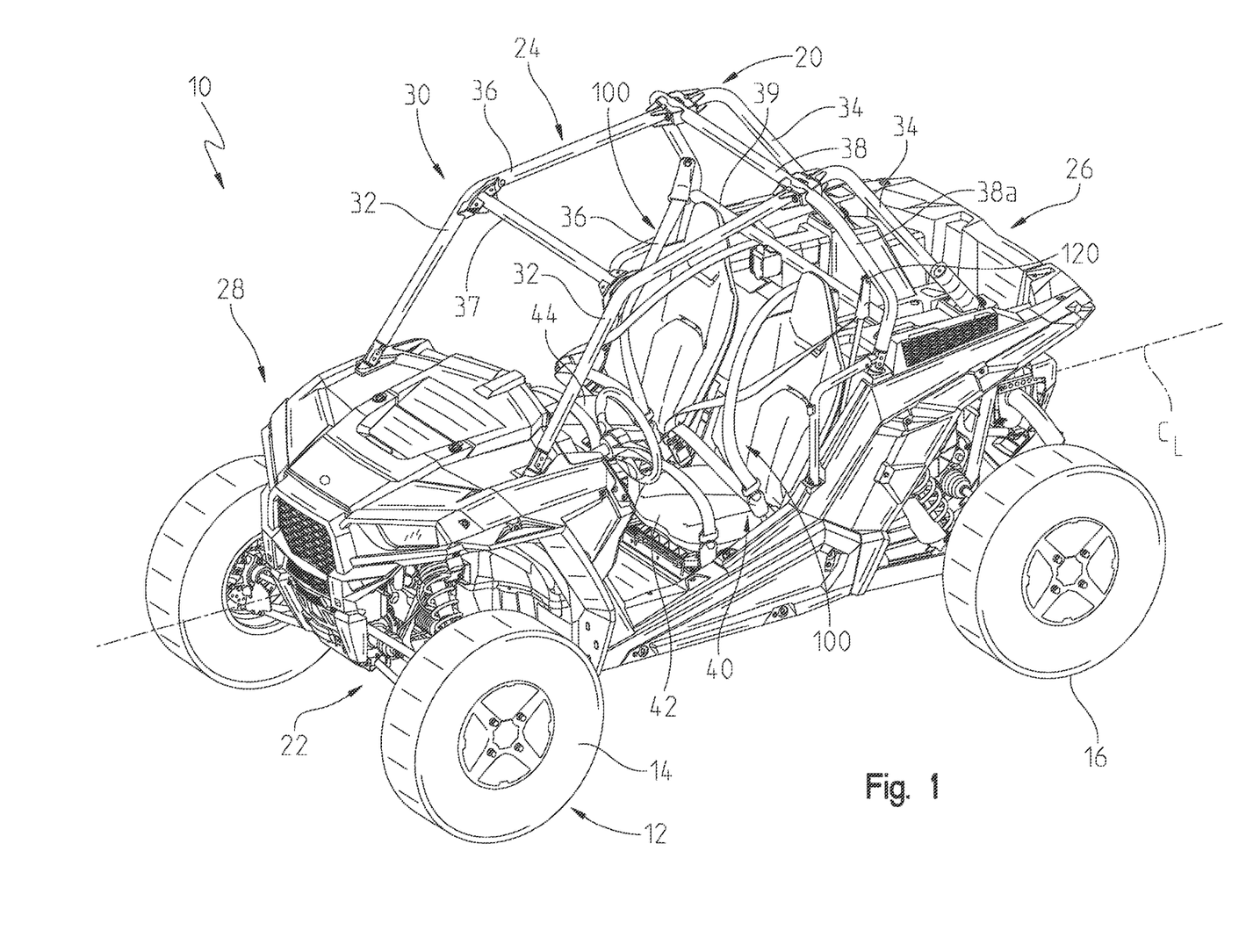
FIG. 1 is a front left perspective view of a utility vehicle of the present disclosure.

Referring to FIG. 1, an illustrative embodiment of an exemplary utility vehicle 10 is shown. The utility vehicle 10 is configured for off-road conditions. The utility vehicle 10 includes a plurality of ground-engaging members 12, illustratively front wheels 14 and rear wheels 16. In one embodiment, one or more of the ground-engaging members 12 may be include tracks, such as the Prospector II Tracks available from Polaris Industries Inc., located at 2100 Highway 55 in Medina, Minn. 55340 such as those shown in U.S. Pat. Nos. 7,673,711 and 10,118,477 or non-pneumatic tires, such as those shown in U.S. Pat. Nos. 8,176,957 and 8,104,524.

The utility vehicle 10 further includes a chassis or frame assembly 20 supported above a ground surface by ground-engaging members 12. The ground surface may be generally level or undulating dirt, grass, concrete, ceramic, polymeric, or other surface. The frame assembly 20 extends along a longitudinal centerline CL of the utility vehicle 10. The frame assembly 20 includes a lower frame assembly 22 and an upper frame assembly 24 extending vertically above lower frame assembly 22. The lower frame assembly 22 supports a rear cargo area 26 and a vehicle body 28, which includes a plurality of body panels. The region bounded by the upper frame assembly 24 and lower frame assembly 22 is referred to as an open-air operator area 30 of utility vehicle 10. However, in other embodiments, the utility vehicle 10 includes a closed-air operator area 30. The upper frame assembly 24 includes front upstanding members 32, rear upstanding members 34, longitudinally extending members 36, a front lateral member 37, a rear lateral member 38, and at least one brace 39. In some embodiments, the rear lateral member 38 is continuous with or coupled to intermediate upstanding members 38a.

As shown in FIG. 1, the operator area 30 includes seating 40 for an operator and one or more passengers. Illustratively, the seating 40 includes an operator seat 42 and a passenger seat 44, however, seating 40 may also include rear seats for additional passengers. Each seat may include a restraint system 100, as described in more detail below. Although only the operator seat 42 and the corresponding restraint system 100 will be discussed in detail, each seat may include a similar restraint system 100 configured to its corresponding seat.

Figure 2:
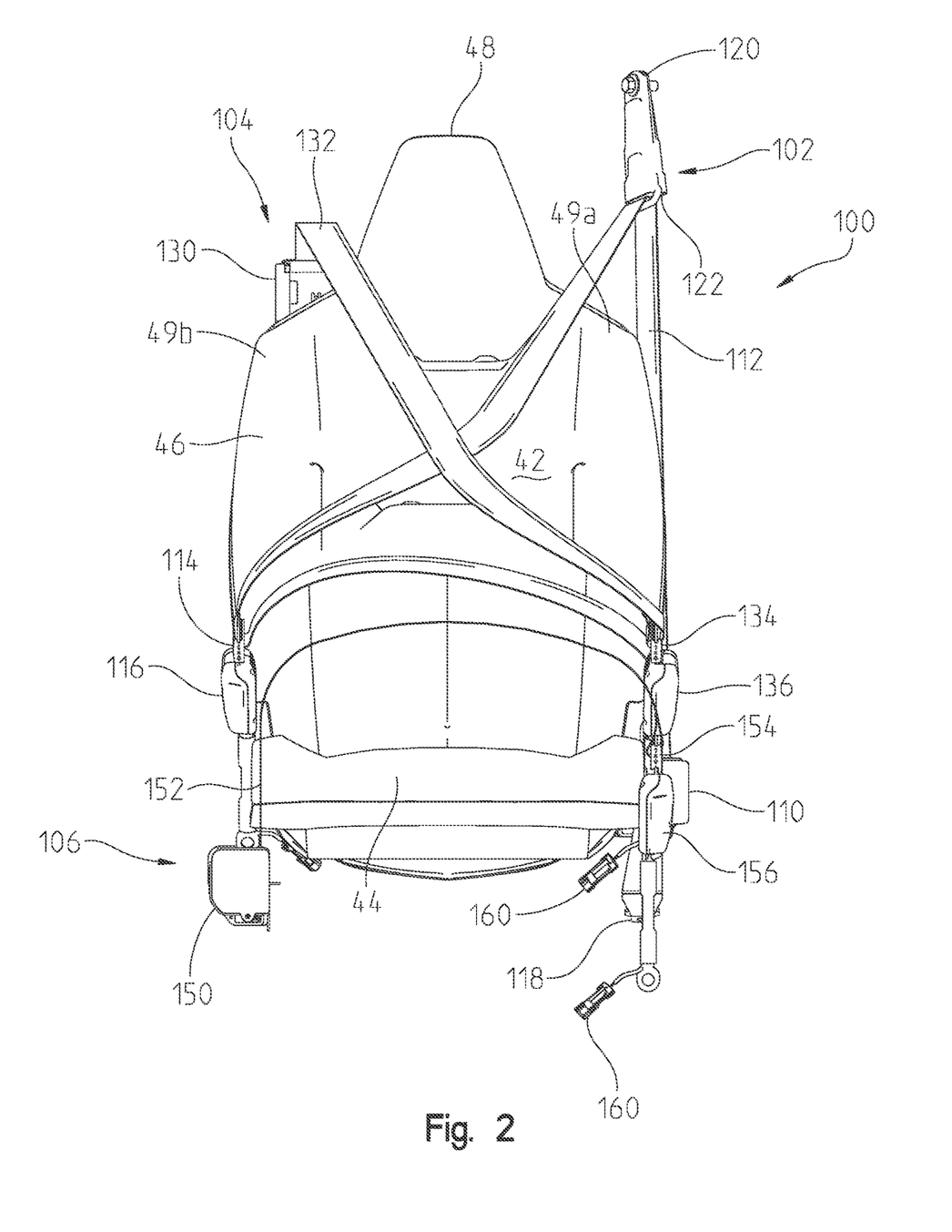
FIG. 2 is a front view of an operator seat with a restraint system, the restraint system including a first restraint assembly, a second restraint assembly, and a third restraint assembly in accordance with an embodiment of the present disclosure.

Referring to FIG. 2, the restraint system 100 includes a first restraint assembly 102, a second restraint assembly 104, and a third restraint assembly 106. Each of the restraint assemblies 102, 104, 106 may include various components such as webbing, anchors, retractors, latches, receivers, electronic controllers, and so forth, which will be discussed in greater detail with respect to each of the restraint assemblies 102, 104, 106.

In certain examples, the first restraint assembly 102 is a three-point harness system that includes a first retractor 110 with a first webbing 112 operably coupled thereto, a first latch 114 operably coupled to the first webbing 112, a first latch receiver 116 operable to receive and releasably retain the first latch 114, a first anchor 118 operable to anchor the first retractor 110 and the first webbing 112 to the utility vehicle 10, and, optionally, a shoulder-portion anchor 120 including a pass-through member 122 through which the first webbing 112 passes. The term "webbing" is intended to be understood throughout the disclosure to also include a solid piece of material. For example, a webbing may include a sewn, woven, knitted, formed, cur or shape material or combination of materials. Furthermore, the webbing may be formed from nylon, leather, or any other suitable material.

The first restraint assembly 102 may be anchored to the utility vehicle at various anchor points. For example, the first restraint assembly 102 may be anchored to the utility vehicle 10 at three anchor points (and optionally, four anchor points) defined by the coupling of the first retractor 110 to the utility vehicle 10 (e.g., retractor anchor point), the first latch receiver 116 to the utility vehicle 10 (e.g., first receiver anchor point), and the first anchor 118 to the utility vehicle 10 (e.g., first end anchor point), and optionally the shoulder-portion anchor 120 at a shoulder-portion anchor point). In some embodiments, the first anchor 118 includes a retractor (not shown) when the first restraint assembly includes a sewn-in latch. Furthermore, the first webbing 112 passes through the pass-through member 122 of the shoulder-portion anchor 120 which is operable to position the webbing across the user's torso by redirecting the first webbing 112 to the appropriate position. Each of the anchor points may be characterized in that the anchor points couple directly to the frame assembly 20 to ensure a secure coupling of the restraint system to the utility vehicle 10. In some embodiments, the anchor points couple indirectly to the frame assembly, for example via a seat subassembly, body of the vehicle, and so forth.

The first restraint assembly 102 may be positioned within the utility vehicle 10 relative to the seating 40 so as to optimize the safety of the rider. For example, the anchor points for the first restraint assembly 102 are positioned so as to facilitate the first webbing 112 to extend across the torso and lap of a user. For example, the first webbing 112 may extend over a shoulder, torso, and lap of a user so as to limit movement of the user within the operator area 30, e.g., movement of the user in the X, Y, and Z directions within the operator area 30. More specifically, the first webbing 112 is operable to restrain a user against the seating 40.

In some embodiments, the first restraint assembly 102 includes adjustable members (not shown) to help facilitate appropriate positioning of the first webbing 112 with respect to the user. For example, an adjustable member may be positioned on the shoulder-portion anchor 120, the pass-through member 122, or between the shoulder-portion anchor 120 and the pass-through member 122, the adjustable member operable to adjust the position of the first webbing 112.

With reference to the anchor points of the first restraint assembly 102, the first restraint assembly 102 may be anchored to the utility vehicle 10 in various configuration. In one example, the anchor points for the first restraint assembly 102 may be directly to the frame assembly 20. More specifically, the first retractor 110, first latch receiver 116, first anchor 118, and shoulder-portion anchor 120 may each be coupled to the frame assembly 20. For example, the first retractor 110, first latch receiver 116, and first anchor 118 may each be independently coupled to the lower frame assembly 22 and the shoulder-portion anchor 120 can be coupled to the upper frame assembly 24. In some embodiments, the first restraint assembly 102 does not include a second anchor or pass-through member, but instead the first retractor 110 is coupled to the upper frame assembly 24. Although anchoring directly to the frame assembly 20 is discussed herein, the first restraint assembly 102 may be anchored to any structure that is sufficient to support and restrain a user, especially in an impact event or the like.

In some embodiments the shoulder-portion anchor 120 is coupled to the intermediate upstanding members 38a, as illustrated in FIG. 1. In other embodiments, the shoulder-portion anchor 120 is coupled to the brace 39. In yet further embodiments, the shoulder-portion anchor 120 is coupled at an intersection between the intermediate upstanding member 38a and the brace 39. As previously disclosed, the first restraint assembly 102 may not implement a second anchor, but the first retractor 110 may be coupled to the upper frame assembly 24. In these embodiments, the first retractor 110 is coupled to the intermediate upstanding members 38a, to the brace 39, or to the upper frame assembly at an intersection between the intermediate upstanding member 38a and the brace 39.

The first restraint assembly 102 is positioned relative to the seating 40 such that the first webbing 112 is positioned with respect to the user as previously described. For example, with respect to the operator seat 42, the first retractor 110, the shoulder-portion anchor 120, and the first anchor 118 are positioned at anchor points on a left side of the operator seat 42 and the first latch 116 is positioned at an anchor point on the right side of the operator seat 42 (from the perspective of a user positioned in the operator seat 42). More specifically, the operator seat 42 includes a leg support portion 44, a back support portion 46, and a head support portion 48, a left shoulder portion 49a and a right shoulder portion 49b. The shoulder-portion anchor 120 and/or the pass-through member 122 are positioned to the left of the head support portion 48 (e.g., such that the first webbing passes over the user's left shoulder. The first retractor 110 is positioned at an anchor point to the left of the leg support portion 44 (see FIG. 2) such that the first webbing 112 extends from a first position laterally adjacent to the left side of leg support portion 44 toward the shoulder-portion anchor 120 and/or the pass-through member 122. In some embodiments, the first retractor 110 may be positioned similarly as described (not shown) with respect to the shoulder-portion anchor 120 and/or the pass-through member 122, meaning to the left of the head support portion 48 such that the first webbing passes over the user's left shoulder, thus eliminating the necessity of the shoulder-portion anchor 120 and/or the pass-through member 122. The first anchor 118 is positioned to the left of the leg support portion 44 The first latch 116 is positioned the right of the leg support portion 44. This permits the first webbing 112 to extend between the first latch 116 and the first anchor 118 across the user's lap. It is understood that the first latch 116 and the first anchor 118 are positioned longitudinally to facilitate placement of the first webbing 112 across the lap as appropriate. Stated otherwise, the first restraint assembly 102, when in an engaged configuration is operable to position the first webbing 112 across the user's torso and lap. For example, in a utility vehicle 10 such as is illustrated in FIG. 1 where the operator seat 42 is on the left side of the utility vehicle 10, the first webbing 112 extends across the operator's torso and across the operator's left shoulder (e.g., left shoulder configuration for operator on left side).

For a passenger positioned on the right side of the utility vehicle 10, the first webbing extends across the right shoulder of the passenger (e.g., right shoulder configuration for passenger on right side). It is within the scope of this disclosure that the first restraint assembly 102 could be positioned at an anchor point so as to position the first webbing over the right shoulder of the operator when the operator seat 42 is on the left side of the utility vehicle 10 (e.g., right shoulder configuration for operator on left side of vehicle), and so forth. It is also within the scope of the disclosure that the operator seat 42 could be positioned on the right side of the vehicle (e.g., left or right shoulder configuration for operator on right side of vehicle). It is understood that a three-point harness may be modified to provide the same support as described above by including separate webbings for torso support and for lap support. In these embodiments, the first restraint assembly 102 may include a plurality of webbings, a plurality of retractors, and a plurality of receivers. It is further understood that the first restraint assembly 102 may not be a three-point harness, but instead is formed of two separate two-point harnesses that provide the same support as a three-point harness.

Figure 3:
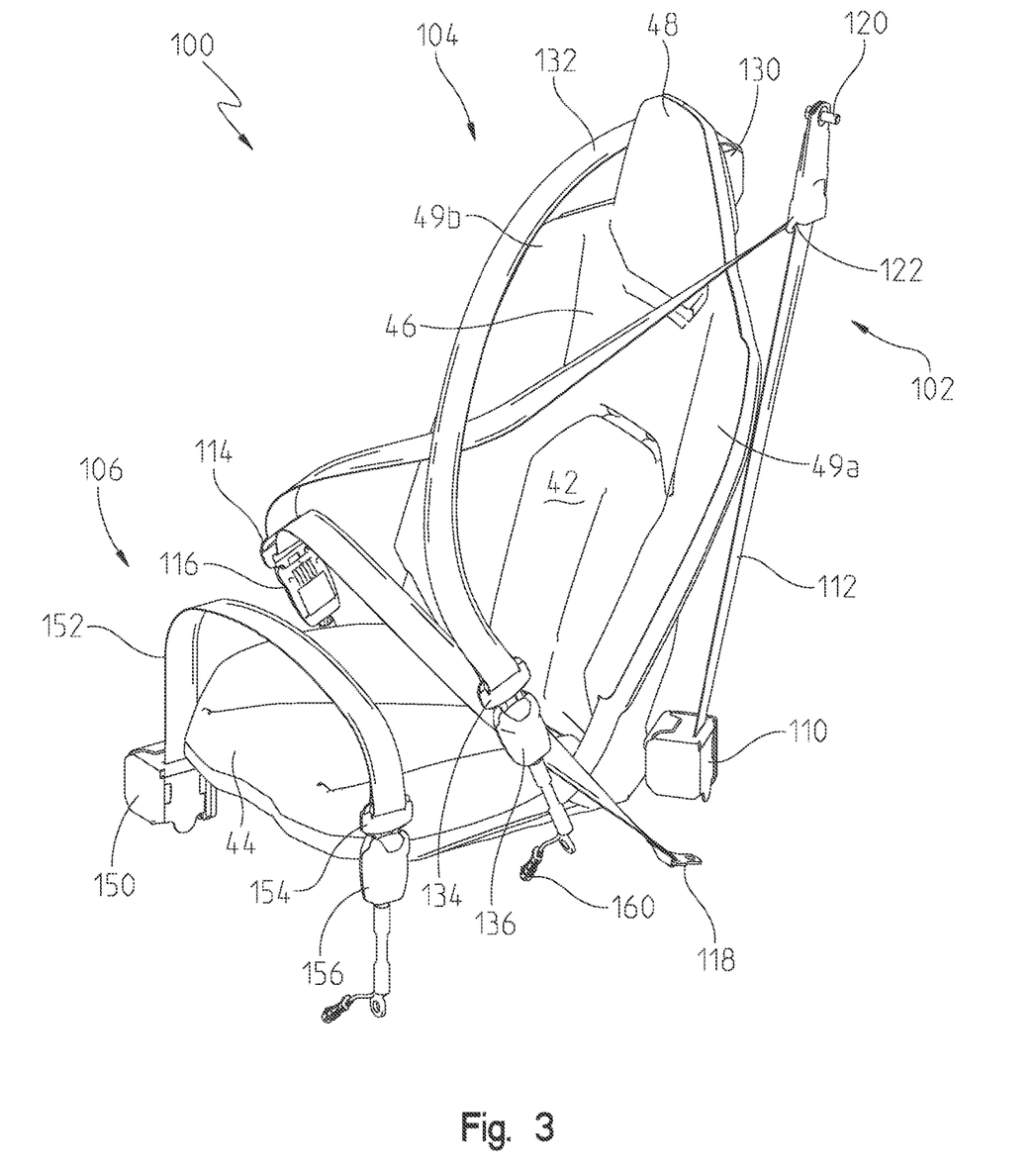
FIG. 3 is a front left perspective view of an operator seat with a restraint system including a first restraint assembly, a second restraint assembly, and a third restraint assembly in accordance with an embodiment of the present disclosure.

Turning now to a discussion of the second restraint assembly 104, the positioning of the components of the second restraint assembly 104 will be discussed as illustrated in FIGS. 1-3. However, similar to the first restraint assembly 102, the positions may be altered to accommodate different configurations of utility vehicles 10. Accordingly, the above disclosed examples of various alternate configurations (e.g., left shoulder and right shoulder configurations) of the first restraint assembly 102 may also be translated to corresponding alternate configurations of the second restraint assembly 104. However, for brevity, each configuration will not be described in detail for the sake of brevity.

The second restraint assembly 104 may be a two-point harness system that includes a second retractor 130 with a second webbing 132 operably coupled thereto, a second latch 134 operably coupled to the second webbing 132, and a second latch receiver 136 operable to receive and releasably retain the second latch 134. The second restraint assembly 104 may be anchored to the utility vehicle 10 at various anchor points. For example, the second restraint assembly 104 may be anchored to the utility vehicle 10 at two positions defined by the coupling of the second retractor 130 to the utility vehicle 10 and the second latch receiver 136 to the utility vehicle 10. Each of the anchor points may be characterized in that the anchor points couple directly to the frame assembly 20 to ensure a secure coupling of the restraint system to the utility vehicle 10.

The second restraint assembly 104 may be positioned within the utility vehicle 10 relative to the seating 40 so as to optimize the safety of the rider. For example, the anchor points for the second restraint assembly 104 are positioned so as to facilitate the second webbing 132 to extend across the torso a user. Appropriate positioning of webbing across the user is known in the art and will therefore not be discussed in detail for the sake of brevity. However, in some embodiments the second restraint assembly 104 may include adjustable members (not shown) to help facilitate appropriate positioning of the second webbing 132 with respect to the user. For example, an adjustable member may be positioned to deflect the second webbing 132 in a specific direction when the second webbing is outside of the second retractor 130, or an adjustable member may be positioned between the second retractor 130 and the frame assembly 20 to allow for the adjustable positioning of the second retractor 130. Adjustable members are known in the art and will not be described in detail for the sake of brevity.

Figure 5:
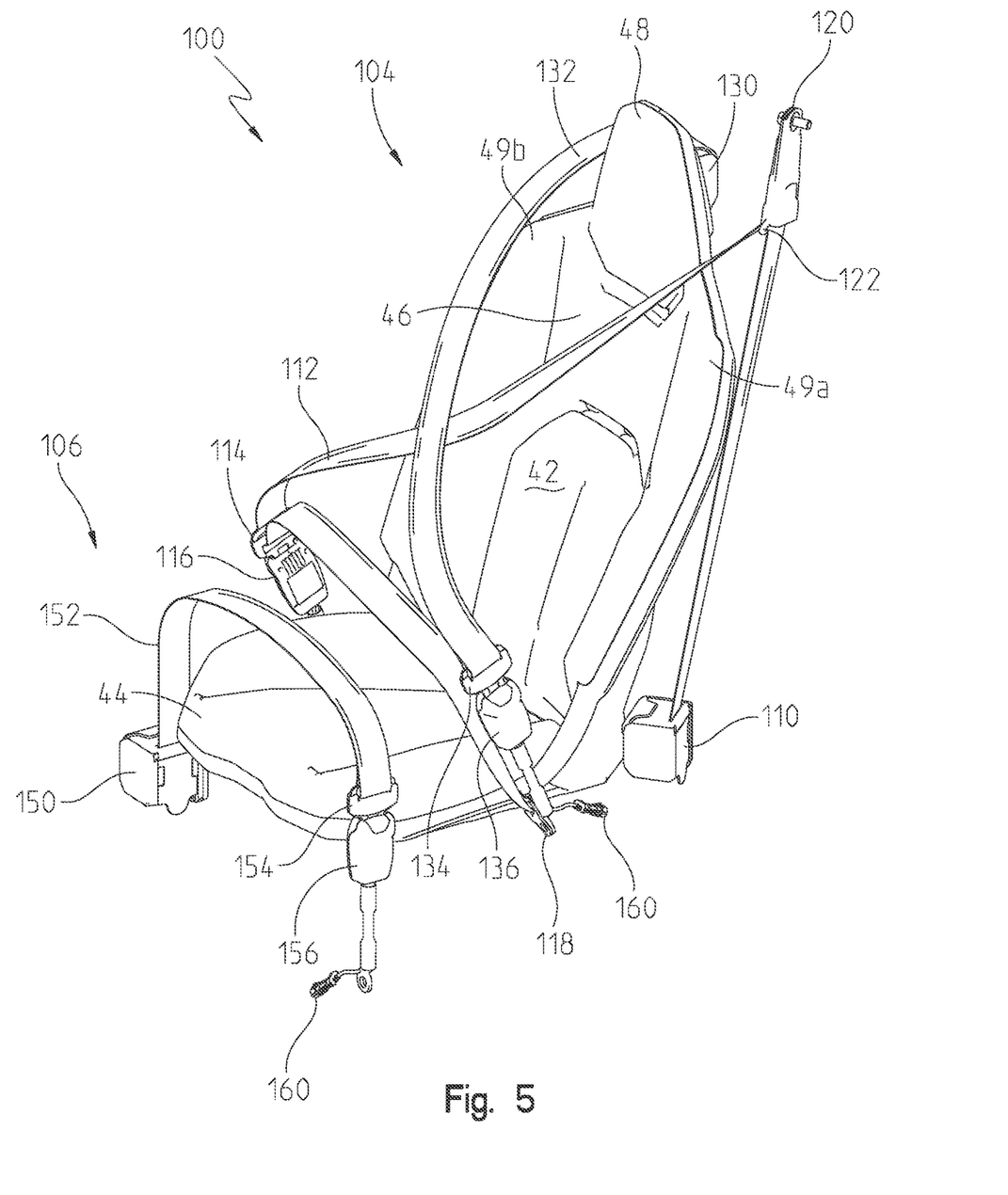
FIG. 5 is a front left perspective view of an operator seat with a restraint system including a first restraint assembly, a second restraint assembly, and a third restraint assembly, wherein portions of the first and second restraint assemblies include a common anchor point in accordance with an embodiment of the present disclosure.

With reference to the anchor points of the second restraint assembly 104, the second restraint assembly 104 may be anchored to the utility vehicle 10 in various configuration. In one example, the anchor points for the second restraint assembly 104 may be directly to the frame assembly 20. More specifically, the second retractor 130 and the second latch receiver 136 may each be coupled to the frame assembly 20. For example, the second retractor 130 may be coupled to the upper frame assembly 24 to the right of the head support portion 48 of the operator seat 42 (e.g., second retractor anchor point) and the second latch receiver 136 can be coupled to the lower frame assembly 22 (e.g., second latch receiver anchor point) to the left of the leg support portion 44 of the operator seat 42 (or in other embodiments, e.g., for the passenger seat, the opposite may be true). In some embodiments, for example as illustrated in FIG. 5, the second latch receiver 136 of the second restraint assembly 104 and the first anchor 118 of the first restraint assembly 102 may share a common anchor point. As illustrated in FIG. 1, the second retractor 130 is coupled to the brace 39. Although anchoring directly to the frame assembly 20 is discussed herein, the second restraint assembly 104 may be anchored to any structure that is sufficient to support and restrain a user, especially in an impact event or the like.

The second restraint assembly 104, when in an engaged configuration is operable to position the second webbing 132 across the user's torso. For example, in a utility vehicle 10 such as is illustrated in FIG. 1 where the operator seat 42 is on the left side of the utility vehicle 10, the second webbing 132 extends across the operator's torso and across the operator's right shoulder (e.g., right shoulder configuration for operator on left side). For a passenger positioned on the right side of the vehicle 10, the second webbing 132 extends across the left shoulder of the passenger (e.g., left shoulder configuration for passenger on right side).

The combination of the first restraint assembly 102 and the second restraint assembly 104 provides an optional three-point or five-point harness restraining system. This allows a user to determine whether they would prefer to implement a three-point harness on a ride (e.g., on a scenic ride) by implementing only the first restraint assembly 102 or a five-point harness on a ride (e.g., a technical trail or a high-speed ride) by implementing both the first and second restraint assemblies 102, 104 simultaneously. In some embodiments, either the first restraint assembly 102, the second restraint assembly 104, or both, may include a fastener (not shown) that can be operated to engage the first webbing 112 of the first restraint assembly 102 and the second webbing 132 of the second restraint assembly 104 with each other, for example at a position substantially laterally centered on the chest or torso of the user.

With further reference to FIGS. 2 and 3, a third restraint assembly 106 is illustrated. The third restraint assembly 106 may be a two-point harness system that includes a third retractor 150 with a third webbing 152 operably coupled thereto, a third latch 154 operably coupled to the third webbing 152, and a third latch receiver 156 operable to receive and releasably retain the third latch 154. The third restraint assembly 106 may be anchored to the utility vehicle 10 at various anchor points. For example, the third restraint assembly 106 may be anchored to the utility vehicle 10 at two positions defined by the coupling of the third retractor 150 to the utility vehicle 10 and the third latch receiver 156 to the utility vehicle 10. Each of the anchor points may be characterized in that the anchor points couple directly to the frame assembly 20 to ensure a secure coupling of the restraint system to the utility vehicle 10.

The third restraint assembly 106 may be positioned within the utility vehicle 10 relative to the seating 40 so as to optimize the safety of the rider. For example, the anchor points (e.g., third retractor anchor point and third receiver anchor point) for the third restraint assembly 106 are positioned so as to facilitate the third webbing 152 to extend across the lap or legs of a user. in some embodiments the third restraint assembly 106 may include adjustable members (not shown) to help facilitate appropriate positioning of the third webbing 152 with respect to the user.

With reference to the anchor points of the third restraint assembly 106, the third restraint assembly 106 may be anchored to the utility vehicle 10 in various configuration. In one example, the anchor points for the third restraint assembly 106 may be directly to the frame assembly 20. More specifically, the third retractor 150 and the third latch receiver 156 may each be coupled to the frame assembly 20. For example, the third retractor 150 and the third latch receiver 156 may each be coupled to the lower frame assembly 22 (or in other embodiments the opposite may be true) laterally adjacent to the left and right of the leg support portion 44 of the operator seat 42. The third retractor 150 and the third latch receiver 156 are positioned longitudinally with respect to the operator seat 42 such that, when in an engaged configuration, the third webbing 152 is positioned across the user's lap or legs. Similar configurations are applicable to passenger seats.

As previously disclosed, the combination of the first restraint assembly 102 and the second restraint assembly 104 provides an optional three-point or five-point harness restraining system. When the third restraint assembly 106 is used in combination with the first restraint assembly 102 and the second restraint assembly 104, an optional seven-point harness restraining system is provided. The user is able to determine the combination of restraint assemblies which best suits the activity in which the user is engaging. For example, the user may implement the first restraint assembly 102, the second restraint assembly 104, and the third restraint assembly 106 all in combination when rock crawling or racing.

By having a restraint system 100 with first, second, and third restraint assemblies 102, 104, 106, the user is able to easily switch between different configuration of the restraint system 100 without needing to remove or install other components. Furthermore, the user is able to quickly and easily switch between the configurations depending on the specific activities or desire for safety or comfort. This includes the ability to switch between configurations on the same ride as the terrain or goal changes, where the switching can occur without stopping the vehicle. For example, a user may be taking a scenic ride and accordingly has only implemented the first restraint assembly 102. However, as the user approaches a hill climb, the user may decide to implement the second restraint assembly 104 in conjunction with the first restraint assembly 102 to provide further safety and security. When the user has travelled beyond the hill climb, the second restraint assembly 104 may be disengaged.

Figure 4:
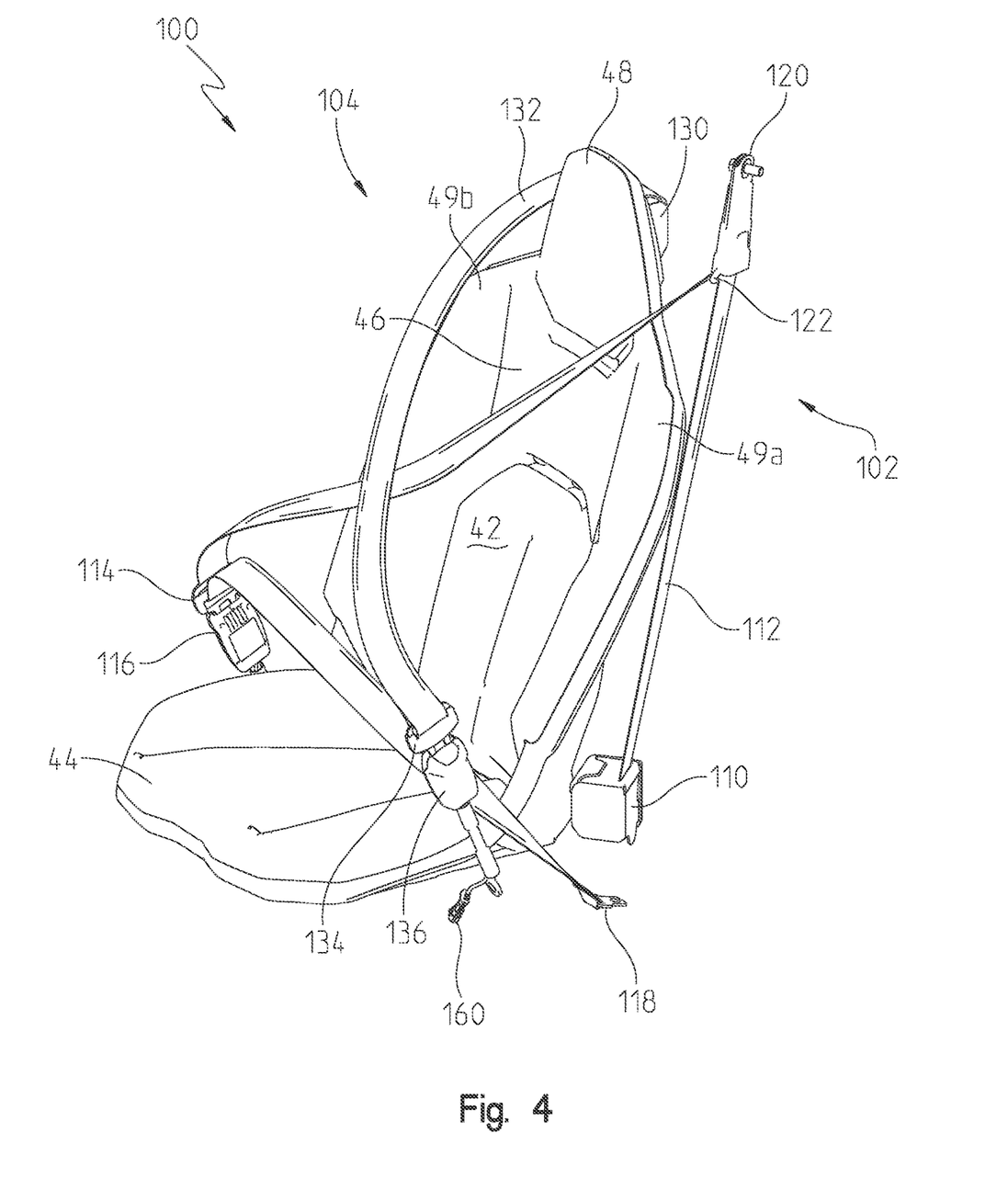
FIG. 4 is a front left perspective view of an operator seat with a restraint system including a first restraint assembly and a second restraint assembly in accordance with an embodiment of the present disclosure.
Figure 6:
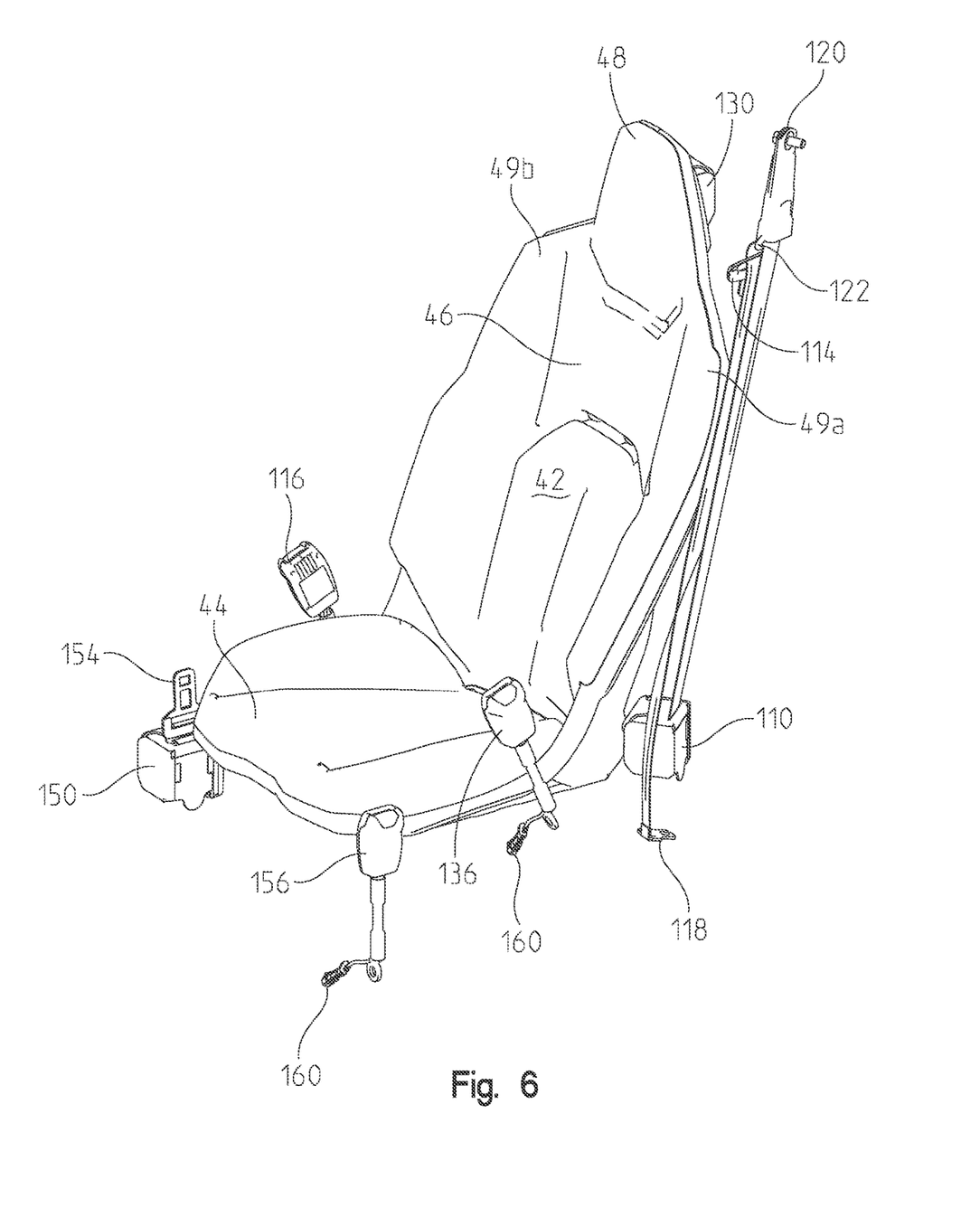
FIG. 6 is a front left perspective view of an operator seat with a restraint system having retractors and latches, the latches being disengaged from the retractors in accordance with an embodiment of the present disclosure.

Referring to FIG. 4, a restraint system 100 is provided in which only first and second restraint assemblies 102, 104 are provided. Certain models of vehicles may not be intended for extreme activities, or a user may not want a third restraint assembly, and therefore the restraint system 100 may include the first and second restraint assemblies 102, 104 that can be reconfigurable between the three-point harness configuration and the five-point harness configuration. Referring to FIG. 6, the restraint system 100 of FIGS. 2-4 is illustrated with the latches 114, 134, 154 disengaged from the latch receivers 116, 136, 156.

Various configuration and combinations of the restraint assemblies 102, 104, 106. In some embodiments, the configurations of restraint assemblies may be implemented, alone, in place of, or in combination with at least one of the restraint assemblies 102, 104, 106 as disclosed in U.S. Pat. No. 10,246,153, filed Apr. 2, 2019, titled SIDE-BY-SIDE VEHICLE, docket PLR-15-25448.04P-US, which is incorporated herein by reference in its entirety.

Figure 7:
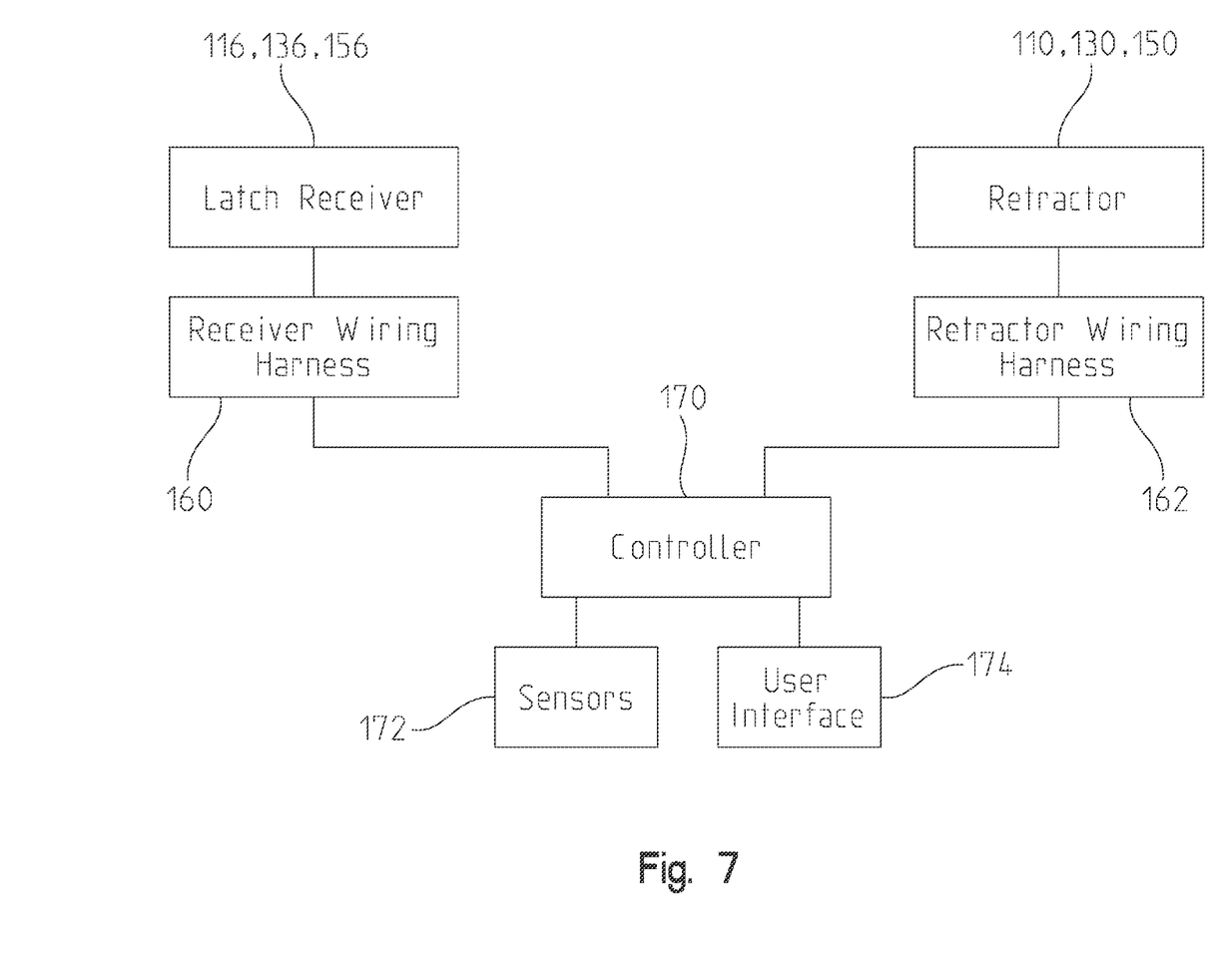
FIG. 7 is a schematic view of a restraint system in accordance with one embodiment of the present disclosure.

In some embodiments, the latch receivers 116, 136, 156 may include wiring harnesses 160. The wiring harnesses are operable to be electronically coupled to a controller 170. The controller 170 detects when the latches 114, 134, 154 are engaged with latch receivers 116, 136, 156. The controller 170 than can provide the status of the latch receivers 116, 136, 156 (e.g., engaged or disengaged) to a user interface 174 (e.g., dashboard, infotainment, speakers, hands free controls) which can notify the user of the status of the latch receivers 116, 136, 156.

Turning now to a discussion of the retractors 110, 130, 150, various retractors may be implemented in conjunction with the restraint system 100. In some embodiments, the retractors 110, 130, 150 are emergency locking retractors (ELR) and/or automatic locking retractors (ALR). As ELR's and ALR's are known, they will not be described in detail for the sake of brevity. In some embodiments, the retractors 110, 130, 150 are also electronic locking retractors. The controller 170 is operable to send an electronic signal to the retractors 110, 130, 150 to lock the retractors 110, 130, 150 to prevent the respective webbing 112, 132, 152 from being released from the retractors 110, 130, 150. Certain predetermined conditions may cause the controller to provide instructions for the retractors 110, 130, 150 to lock. For example, certain vehicle conditions may trigger locking of the retractors 110, 130, 150 such as latches 114, 134, 154 being positioned in latch receivers 116, 136, 156, transmission status (e.g., transmission in drive), and so forth. In some embodiments, the utility vehicle 10 includes sensors 172 for sensing conditions on the utility vehicle 10. Sensors 172 may include, but are not limited to pressure sensors, position sensors, speedometers, gyros, accelerometers, temperature sensors, voltmeters, and so forth. As the sensors 172 detect certain conditions of the utility vehicle 10, the sensors 172 provide the information relating to the detected condition to the controller 170. The controller 170 may then provide an electronic signal to the retractors 110, 130, 150 to lock the retractors 110, 130, 150 to prevent the respective webbing 112, 132, 152 from being released from the retractors 110, 130, 150. The retractors 110, 130, 150 may implement any combination of an electronic locking retractors, ALR's, and ELR's.

In some embodiments, the retractors 110, 130, 150 may be pretensioner retractors. Pretensioner retractors 110, 130, 150 are operable to tension the webbing 112, 132, 152 to a predetermined tension level. Tensioning of the webbing 112, 132, 152 may be used to secure a user based on predefined conditions and/or to provide notification to the user of predefined conditions. The tension level of the webbing 112, 132, 152 may be activated based on a variety of inputs.

As previously disclosed, the restraint system 100 may include a controller 170, sensors 172, and a user interface 174. The controller 170 may be integrated into other safety systems and/or drive control systems existing on the utility vehicle 10 (e.g., Dynamix) or is operable to receive input from other systems on the utility vehicle 10 (e.g., safety system). Some of the described systems discussed are disclosed in U.S. patent application Ser. No. 12/475,531, filed May 31, 2009, titled VEHICLE SECURITY SYSTEM, docket PLR-00TC-22557.01P-US, U.S. patent application Ser. No. 16/198,280, filed Nov. 21, 2018, titled VEHICLE HAVING ADJUSTABLE COMPRESSION AND REBOUND DAMPING, docket PLR-15-28021.01P-US, U.S. patent application Ser. No. 63/053,278, filed Jul. 17, 2020, titled VEHICLE HAVING ADJUSTABLE COMPRESSION AND REBOUND DAMPING, docket PLR-15-29249.01P-US, U.S. patent application Ser. No. 14/074,340, filed Nov. 7, 2013, titled VEHICLE HAVING SUSPENSION WITH CONTINUOUS DAMPING CONTROL, docket PLR-15-25091.02P-US, U.S. patent application Ser. No. 63/012,811, filed Apr. 20, 2020, titled SYSTEMS AND METHODS FOR COMMUNICATING INFORMATION, docket PLR-12-28676.01P-US, and U.S. patent application Ser. No. 63/013,272, filed Apr. 21, 2020, titled SYSTEMS AND METHODS FOR OPERATING AN ALL-TERRAIN VEHICLE, docket PLR-15-29107.01P-US which are each incorporated herein by reference in their entireties.

Whether the controller 170 receives input from dedicated sensors 172, user inputs (e.g., pucker button), or from other systems, the pretensioner retractors 110, 130, 150 are activated when instructions are sent from the controller 170 (e.g., via a retractor wiring harness 162 or via wireless transmission). The pretensioner retractors 110, 130, 150 can include at least two active modes. The first active mode is a notification mode. The second active mode is a safety pre-tensioning mode.

With regard to the notification mode, the pretensioner retractors 110, 130, 150 is operable to provide notification to a user based on specific conditions. The pretensioner can be used to communicate the conditions to the user by tensioning the webbing 112, 132, 152 to a predetermined tension level. Different levels of tension may be applied to communicate different information, each piece of information associated with a specific tension level. Different patterns of tensioning may be applied to communicate different information, each piece of information associated with a specific pattern of tensioning. For example, any one or a combination of the webbings 112, 132, 152 can be tensioned in patterns such as short pulls, long pulls, or combinations thereof. Furthermore, one pretensioner retractor is used to communicate certain information (e.g., the first retractor 110 pretensions the first webbing 112 to communicate safety information, for example, engine over heating) and another pretensioner retractor 110, 130, 150 is used to communicate other information (e.g., the second retractor 130 pretensions the second webbing 132 to communicate vehicle information, for example, a low fuel level). Although the following list is not exhaustive of the types of information or warnings that can be communicated to the user through the pretensioner 110, 130, 150, some examples include pitch and roll angles, brake temperature, belt temperature, engine temperature, misfire of cylinder, low fuel, engine speed, vehicle speed, and so forth. Multiple levels of tensioning may be provided for safety events versus non-safety events. The information being communicated to the user may also be provided in other formats such as sounds (e.g., chimes), lights or messages (e.g., on dashboard or infotainment interface), vibrations (e.g., steering wheel or seat).

Turning now to a discussion of the safety mode, the pretensioner retractors 110, 130, 150 are operable to tension the respective webbing 112, 132, 152 in response to specific conditions. Although the following list of conditions for which the pretensioner retractors 110, 130, 150 are activated to pre-tension the respective webbings 112, 132, 152 to predetermined tensions is not exhaustive, such conditions may include utility vehicle 10 being airborne or airborne over a predetermined period of time, pitch angle, pitch rate, roll angle, roll rate, steering angle, steering velocity, brake pressure, rate of acceleration, vehicle speed, engine speed, gear position, and so forth. More generally, the pretensioner retractors 110, 130, 150 may be activated during events such as collisions, roll-overs, and extended airborne time.

The pretensioner retractors 110, 130, 150 may also be directly activated by user input (e.g., an option via the infotainment system or a setting activated by a button). The user may activate the pretensioner retractors 110, 130, 150 to tension the webbings 112, 132, 152 to a predetermined level, or the tensioning level may be selected to the user preference. Furthermore, the controller 170 may include user profiles which allows the webbing 112, 132, 152 to be tensioned to each specific user based on the user profile. The controller 170 is operable to send instructions to each pretensioner retractor 110, 130, 150 to tension the webbings 112, 132, 152 based on the user profile either in response to a selection by the user or by sensing the user. For example, the controller 170 may receive input that a specific user is positioned in the operator seat 42 (e.g., senses user's helmet or communication set).

The pretensioner retractors 110, 130, 150 may also be activated by other systems of the utility vehicle 10, as previously discussed. For example, if the utility vehicle is in a demonstration mode, the pretensioner retractors 110, 130, 150 are operable to tension the webbings 112, 132, 152 to a predetermined tension. Any other mode may include other pretension settings in which the pretensioner retractors 110, 130, 150 apply tension to the webbings 112, 132, 152 in response to the mode of the utility vehicle 10 (e.g., race mode, climb mode, trail mode, sport mode, and so forth).

Because the restraint system 100 may include a plurality of assemblies (e.g., first, second, and third restraint assemblies 102, 104, 106), and each assembly may include a pretensioner retractor 110, 130, 150, the various pretensioners may be operable to be activated independently, collectively, or a combination of both. For example, when the pretensioner retractors 110, 130, 150 are used to send non-safety notification, the third restraint assembly 106 may be implemented whereas safety notifications may be provided via the first and/or second restraint assemblies 102, 104. However, when there is a safety event to which the restraint system 100 is responding, the first, second, and third restraint assemblies 102, 104, 106 may be activated collectively.

Furthermore, each pretensioner retractor 110, 130, 150 may include onboard sensors (e.g., tension or pressure sensors) for determining the level of tension across the respective webbings 112, 132, 152. This allows the pretensioner retractor 110, 130, 150 to tension the webbings 112, 132, 152 to a predetermined tension without over tensioning. Furthermore, in certain safety events, the pretensioner retractors 110, 130, 150 may allow some release of the webbings 112, 132, 152 when an excessive tension is sensed (e.g., to release some pressure across a chest in a sudden deceleration such as in an accident). In these embodiments, the length of 112, 132, 152 that may be released during certain safety events to prevent other injuries (e.g., limited so that a user does not contact the steering wheel).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A restraint system for a utility vehicle comprising:
   a first restraint including a first retractor coupled to the utility vehicle at a first retractor anchor point, a first webbing extendable from and retractable into the first retractor and having a first end coupled to the utility vehicle at a first end anchor point and a second end coupled to the first retractor, a first latch moveably engaged with the first webbing between the first and second end, and a first latch receiver configured to receive the first latch and retain a portion of the first webbing to the utility vehicle at a first receiver anchor point;
   a second restraint including a second retractor coupled to the utility vehicle at a second retractor anchor point, a second webbing extendable from and retractable into the second retractor and having a first end coupled to the second retractor and a second end, a second latch coupled to the second webbing at the second end of the second webbing, and a second latch receiver positioned at a second receiver anchor point and configured to receive the second latch and retain the second end of the second webbing adjacent the second receiver anchor point; and
   a sensor array operable to provide an electronic signal to at least one of the first retractor and the second retractor for performing at least one of selectively locking and pretensioning in response to detecting at least one of a predetermined utility vehicle condition and a user input, wherein the sensor array is operable to provide the electronic signal in response to detecting a predetermined fuel level.

2. The restraint system of claim 1, wherein the sensor array is operable to provide the electronic signal in response to detecting a vehicle speed above a threshold vehicle speed.

3. The restraint system of claim 2, wherein the first and second retractors are operable to be selectively locked in response to the electronic signal.

4. The restraint system of claim 1, wherein the sensor array is operable to provide the electronic signal in response to detecting brake pressure above a threshold brake pressure.

5. The restraint system of claim 1, wherein the sensor array is operable to provide the electronic signal in response to detecting a predetermined pedal position.

6. The restraint system of claim 1, wherein the first and second retractors are operable to pretension the first and second webbings respectively in response to the electronic signal.

7. The restraint system of claim 6, wherein the first and second retractors are operable to be selectively locked after pretensioning the first and second webbings, respectively.

8. The restraint system of claim 6, wherein the sensor array is operable to provide the electronic signal to at least one of the first retractor and the second retractor based on at least one of the utility vehicle conditions, wherein the first and second webbings are pretensioned and released as a driver warning in response to the electronic signal.

9. The restraint system of claim 8, wherein the sensor array is operable to sense at least one of brake temperature, belt temperature, engine temperature, low fuel, engine speed, and misfiring of engine.

10. The restraint system of claim 1, wherein the sensor array is operable to provide the electronic signal in response to detecting a predetermined engine speed.

11. The restraint system of claim 1, wherein the sensor array is operable to provide the electronic signal in response to detecting a predetermined fault condition.

12. The restraint system of claim 1, wherein the sensor array is operable to provide the electronic signal in response to detecting a predetermined pitch angle of the utility vehicle.

13. The restraint system of claim 1, further comprising a third restraint including a third retractor coupled to the utility vehicle at a third retractor anchor point, a third webbing extendable from and retractable into the third retractor and having a first end coupled to the third retractor and a second end, a third latch coupled to the third webbing at the second end, and a third latch receiver positioned at a third receiver anchor point and configured to receive the third latch and retain the second end of the third webbing adjacent the third receiver anchor point, operable to removably couple with the third latch and operable to couple with the utility vehicle at a seventh position, the third webbing.

14. The restraint system of claim 13, wherein the first restraint is operable to extend across a user's shoulder, torso, and lap, wherein the second restraint is operable to extend across the user's torso and opposite shoulder, and wherein the third restraint is operable to extend across the user's legs.

15. The restraint system of claim 1, wherein the sensor array is operable to provide the electronic signal in response to detecting a predetermined roll angle.

16. The restraint system of claim 1, wherein the sensor array is operable to provide the electronic signal in response to detecting a predetermined gear position.

17. The restraint system of claim 1, wherein the sensor array is operable to provide the electronic signal in response to detecting a predetermined steering angle.

18. The restraint system of claim 1, wherein the sensor array is operable to provide the electronic signal in response to detecting a predetermined steering velocity.

19. The restraint system of claim 1, wherein the sensor array is operable to provide the electronic signal in response to detecting a predetermined key switch position.

20. The restraint system of claim 1, wherein the sensor array is operable to provide the electronic signal in response to detecting each of a predetermined brake pressure, a predetermined vehicle speed, a predetermined pitch angle, a predetermined roll angle, and a predetermined steering characteristic.

21. A restraint system for securing a user in a utility vehicle comprising:
- a first restraint including a first webbing and a first pretensioner retractor, the first restraint having an engaged configuration and a disengaged configuration, the first webbing being positioned across a first shoulder, a torso, and a lap of the user in the engaged configuration; and
- a second restraint including a second webbing and a second pretensioner retractor, the second restraint having an engaged configuration and a disengaged configuration, the second webbing being positioned across a second shoulder and the torso of the user in the engaged configuration,
- wherein at least one of the first and the second pretensioner retractors is operable to be pretensioned in response to a predetermined event, wherein at least one of the first and the second pretensioner retractors includes a safety pre-tensioning mode and a notification pre-tensioning mode, wherein in the notification pre-tensioning mode, one of the first and second pretensioners is pretensioned in predetermined patterns.

22. The restraint system of claim 21, wherein the first restraint and the second restraint are operable to be independently maintained in the engaged configuration and the disengaged configuration, respectively.

23. The restraint system of claim 22, further comprising a third restraint including a third webbing, the third restraint having an engaged configuration and a disengaged configuration, the third webbing being positioned across legs of the user in the engaged configuration.

24. A utility vehicle comprising:
- a plurality of ground-engaging members;
- a frame supported by the plurality of ground-engaging members;
- an operator area supported by the frame and having at least an operator seat including a seat bottom and a seat back configured to support an operator;
- a first restraint including a first webbing and a first pretensioner retractor, the first restraint having an engaged configuration and a disengaged configuration, the first webbing being positioned across a first shoulder and a torso of the operator in the engaged configuration; and
- a second restraint including a second webbing and a second pretensioner retractor, the second restraint having an engaged configuration and a disengaged configuration, the second webbing being positioned across a second shoulder and the torso of the operator in the engaged configuration,
- wherein at least one of the first and second pretensioner retractors is operable to pretension the first or second webbing to one of a plurality of tension levels based on various predetermined events, wherein the plurality of tension levels includes at least a first tension level and a second tension level, the first tension level being different from the second tension level, wherein one of the various predetermined events includes a predetermined fuel level.

25. The utility vehicle of claim 24, wherein the first restraint further includes a first retractor, the first webbing coupled to the first retractor, and wherein the second restraint further includes a second retractor, the second webbing coupled to the second retractor.

26. The utility vehicle of claim 25, further comprising a sensor array operable to sense at least one of utility vehicle conditions and user input and provide an electronic signal to the first and second retractors when a predetermined utility vehicle condition or user input is sensed, the first and second retractors operable to lock upon receipt of the electronic signal.

27. The utility vehicle of claim 26, wherein the first and second retractors are operable to pretension the first and second webbings upon receipt of the electronic signal.

28. A restraint system for a utility vehicle comprising:
- a first restraint including a first retractor coupled to the utility vehicle at a first retractor anchor point, a first webbing extendable from and retractable into the first retractor, a first latch coupled to the first webbing, a first latch receiver configured to receive the first latch and retain a portion of the first webbing to the utility vehicle at a first receiver anchor point, and a first pretensioner retractor operable to tension the first webbing; and
- a second restraint including a second retractor coupled to the utility vehicle at a second retractor anchor point, a second webbing extendable from and retractable into the second retractor and having a first end coupled to the second retractor and a second end, a second latch coupled to the second webbing at the second end of the second webbing, a second latch receiver positioned at a second receiver anchor point and configured to receive the second latch and retain the second end of the second webbing adjacent the second receiver anchor point, and a second pretensioner retractor operable to tension the second webbing; and
- wherein at least one of the first and second pretensioner retractors include a notification pretensioning mode in which one of the first and second pretensioners is pretensioned in predetermined patterns.

29. The restraint system of claim 28, wherein the first and second retractors are operable to pretension the first and second webbings respectively in response to an electronic signal.

* * * * *